(12) United States Patent
Fatiny et al.

(10) Patent No.: US 11,219,504 B1
(45) Date of Patent: *Jan. 11, 2022

(54) DENTAL COSMETIC SCALPEL

(71) Applicant: King Abdulaziz University, Jeddah (SA)

(72) Inventors: Fahad Ibrahim Fatiny, Jeddah (SA); Helal M. Sunbol, Jeddah (SA); Turki Y. Alhazzazi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,125

(22) Filed: Sep. 23, 2021

Related U.S. Application Data

(60) Continuation of application No. 17/338,808, filed on Jun. 4, 2021, which is a division of application No. 15/794,718, filed on Oct. 26, 2017, now Pat. No. 11,154,380.

(51) Int. Cl.
*A61C 3/02* (2006.01)

(52) U.S. Cl.
CPC ..................................... *A61C 3/02* (2013.01)

(58) Field of Classification Search
CPC .................. A61C 3/00; A61C 3/02; A61B 17/3211–3217
See application file for complete search history.

(56) References Cited

U.S. PATENT DOCUMENTS

| | | | |
|---|---|---|---|
| 1,940,855 A | 12/1933 | Friedman | |
| 2,507,019 A | 5/1950 | Johnson | |
| 2,569,844 A | 10/1951 | Berliner | |
| 2,838,049 A | 6/1958 | Eisenhofer et al. | |
| 3,262,205 A | 7/1966 | Arden | |
| 3,300,858 A | 1/1967 | Young | |
| 3,307,259 A | 3/1967 | Christensen | |
| 3,411,211 A | 11/1968 | Fountain | |
| 3,412,467 A | 11/1968 | Matwijcow | |
| 3,471,929 A | 10/1969 | Boone | |
| 3,609,864 A | 10/1971 | Bassett | |
| 3,683,498 A | 8/1972 | Riley | |
| 3,740,779 A | 6/1973 | Rubricuis | |
| 3,798,688 A | 3/1974 | Wasson | |
| 3,877,147 A | 4/1975 | Cummings | |
| 3,900,950 A | 8/1975 | Collins | |
| 4,270,902 A | 6/1981 | Wiland | |
| 4,414,974 A | 11/1983 | Dotson et al. | |
| 4,534,348 A | 8/1985 | Fedorov et al. | |
| 4,543,062 A | 9/1985 | Lee | |

(Continued)

FOREIGN PATENT DOCUMENTS

| | | |
|---|---|---|
| EP | 0 289 957 A1 | 11/1988 |
| WO | WO 00/61014 A1 | 10/2000 |
| WO | WO 2006/043164 A1 | 4/2006 |

OTHER PUBLICATIONS

"Periodontal Instruments", periobasics.com, http://periobasics.com/periodontal-instruments.html, Jul. 9, 2004, 46 pages.

*Primary Examiner* — Heidi M Eide
*Assistant Examiner* — Drew S Folgmann
(74) *Attorney, Agent, or Firm* — Oblon, McClelland, Maier & Neustadt, L.L.P.

(57) ABSTRACT

A scalpel that safely and efficiently removes excess dental composite from the surfaces of teeth. A method for removing excess dental composite from a dental surface using this dental scalpel.

7 Claims, 6 Drawing Sheets

(56) References Cited

U.S. PATENT DOCUMENTS

| | | |
|---|---|---|
| 4,608,757 A | 9/1986 | Eckerle |
| 4,611,400 A | 9/1986 | Drake |
| 4,743,198 A | 5/1988 | Kennedy |
| 4,844,070 A | 7/1989 | Dee |
| 4,881,534 A | 11/1989 | Uhl |
| 4,887,599 A | 12/1989 | Muller |
| 4,922,614 A | 5/1990 | Machida |
| 4,936,449 A | 6/1990 | Conard et al. |
| 4,985,035 A | 1/1991 | Torre |
| 5,026,385 A | 6/1991 | Schutte et al. |
| 5,035,703 A | 7/1991 | Baskas |
| 5,055,106 A | 10/1991 | Lundgren |
| 5,102,083 A | 4/1992 | Baskas |
| 5,154,708 A | 10/1992 | Long et al. |
| 5,263,972 A | 11/1993 | Evans et al. |
| 5,306,282 A | 4/1994 | Muller |
| 5,423,841 A | 6/1995 | Korenfeld |
| 5,454,534 A | 10/1995 | Baskas |
| 5,468,247 A | 11/1995 | Matthai et al. |
| 5,484,434 A | 1/1996 | Cartmell et al. |
| 5,601,584 A | 2/1997 | Obagi et al. |
| 5,702,360 A | 12/1997 | Dieras et al. |
| 5,702,415 A | 12/1997 | Matthai et al. |
| 5,797,944 A | 8/1998 | Nobles |
| 5,830,225 A | 11/1998 | Detsch |
| 6,105,260 A | 8/2000 | Parrish et al. |
| 6,955,676 B2 | 10/2005 | Quick |
| 6,997,709 B2 | 2/2006 | Kangasniemi et al. |
| 7,081,118 B2 | 7/2006 | Weber et al. |
| 7,131,982 B1 | 11/2006 | Karapetyan |
| 7,150,754 B2 | 12/2006 | Ziemer |
| 7,572,256 B2 | 8/2009 | Quick |
| 7,647,704 B2 | 1/2010 | Petersen |
| 7,748,124 B1 | 7/2010 | Bell et al. |
| 7,797,836 B2 | 9/2010 | Ranieri et al. |
| 8,277,217 B2 | 10/2012 | Park et al. |
| 8,287,597 B1 | 10/2012 | Pimenta |
| 8,801,433 B1 | 8/2014 | Charlton |
| 8,819,943 B2 | 9/2014 | Maxwell |
| 8,850,662 B2 | 10/2014 | Gitman et al. |
| 8,984,755 B2 | 3/2015 | De |
| 2003/0022131 A1 | 1/2003 | Kangasniemi |
| 2004/0039397 A1 | 2/2004 | Weber et al. |
| 2005/0095558 A1 | 5/2005 | Jones |
| 2006/0041266 A1 | 2/2006 | Sullivan et al. |
| 2007/0088374 A1 | 4/2007 | Masury et al. |
| 2007/0156160 A1 | 7/2007 | Petersen |
| 2010/0184000 A1 | 7/2010 | Beach |
| 2012/0231411 A1 | 9/2012 | Verronneau |

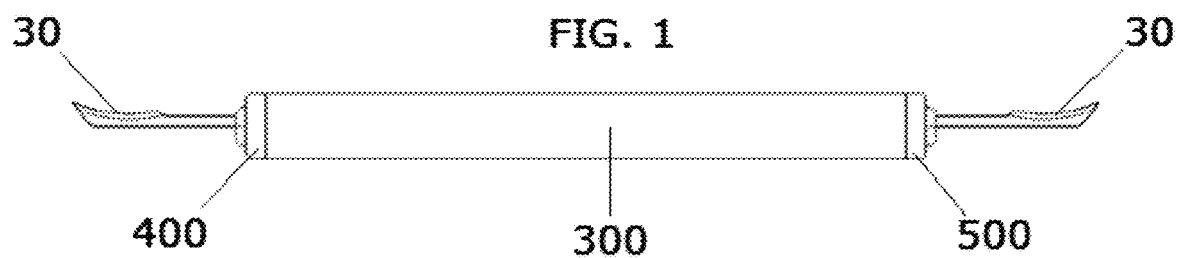
FIG. 1
FIG. 2A
FIG. 2B
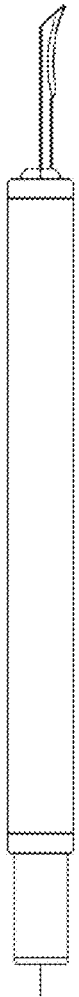
FIG. 2C
FIG. 2D

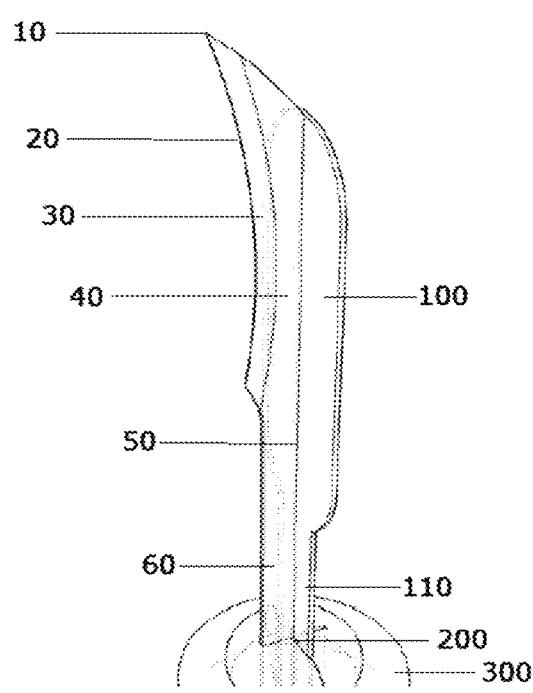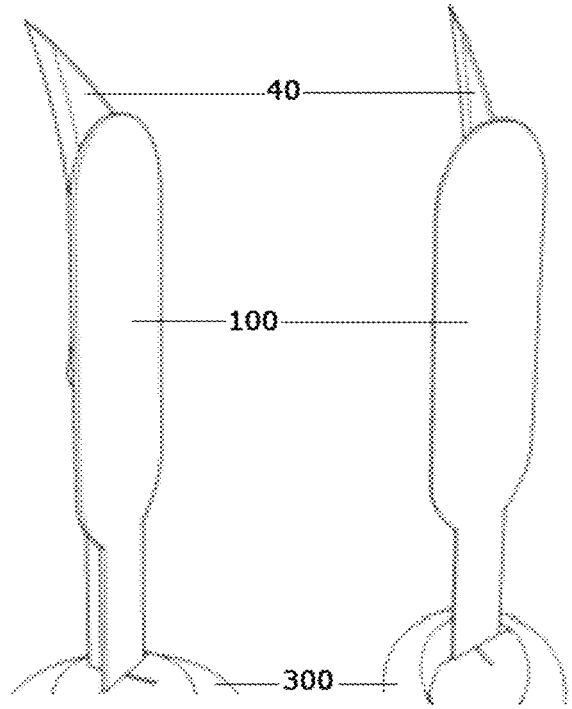

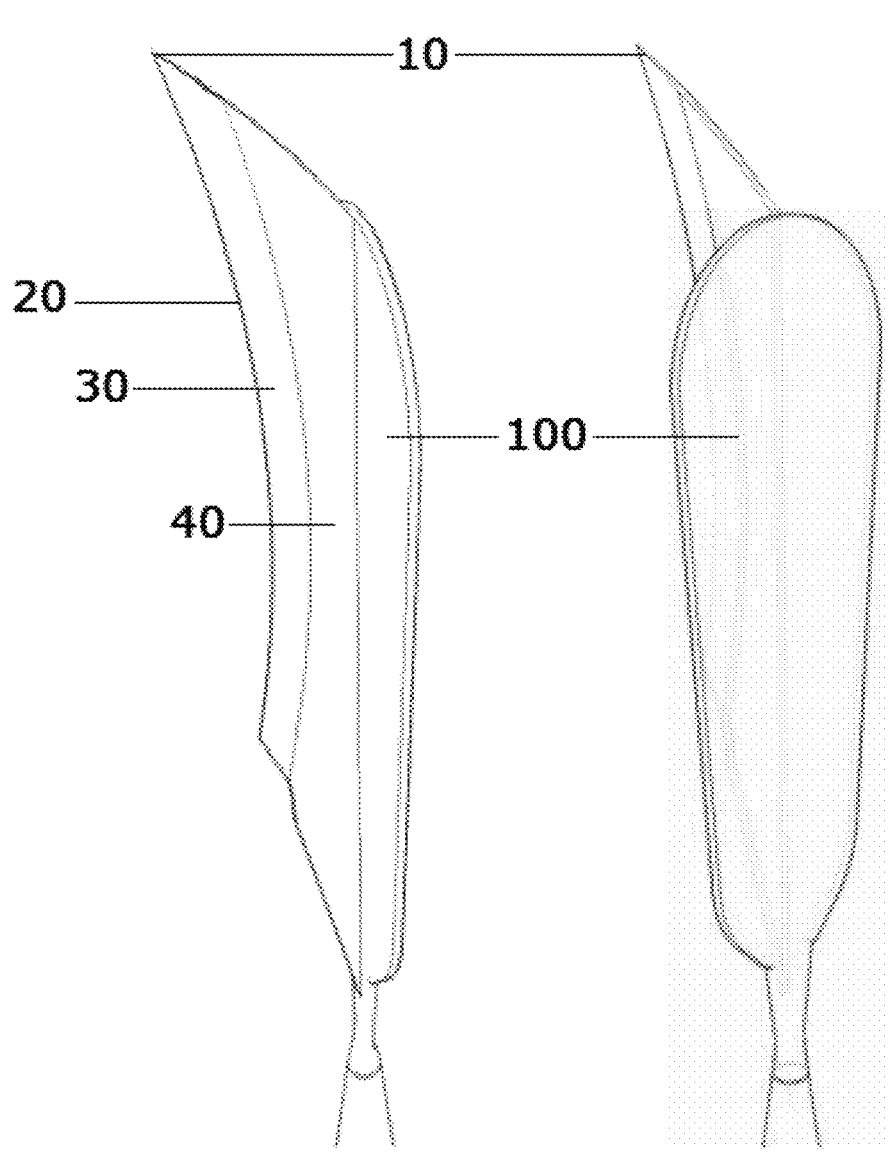

DENTAL COSMETIC SCALPEL

CROSS-REFERENCE TO RELATED APPLICATIONS

The present application is a Continuation of U.S. application Ser. No. 17/338,808, pending, having a filing date of Jun. 4, 2021 which is a Division of U.S. application Ser. No. 15/794,718, now allowed, having a filing date of Oct. 26, 2017.

BACKGROUND

Field of the Disclosure

The present invention relates to dental tools and more particularly to a scalpel suitable for safely removing residual or excess resin composites or other dental restorative materials from the interproximal and other surfaces of a tooth.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A dental restoration, such as a white dental filling, is formed in a cavity in a tooth by applying a dental restoration material usually a composite resin. Composite resins are generally applied to a cavity in a three-step process. First, the cavity is filled with a composite material, then the composite is polymerized, cured or hardened by subjecting it to ultraviolet light, and finally, excess composite is removed by scraping or carving it away from the tooth to provide a uniform and smooth surface and to give the filled tooth a natural appearance.

Excess composite resin remaining on a tooth after a filling is formed can trap food particles, cause discomfort to the patient, or be aesthetically unacceptable. Thus, when removing excess composite, it is important to completely remove all of the excess, particularly along the gum line and from interproximal surfaces between teeth which are difficult to safely access and clean with existing dental instruments which are designed for other purposes such as soft tissue removal or the removal of calculus/tartar from teeth.

Excess composite resin is typically removed from a tooth with the aid of an instrument designed for another purpose such as a scaler or plaque-removing tool for removing dental plaque. Plaque-removing instruments typically have a cylindrical handle with a dental pick at one end or have a single blade extending from a cylindrical handle for manipulating silver filling material. Neither of these types of instruments is well suited for removing excess hardened composite resin from interproximal surfaces of a tooth. Specifically, neither incorporates a blade that is contoured for use on the curved interproximal surfaces of a tooth nor does either incorporate a beveled carving edge disposed at an ergonomic angle with respect to the shaft or handle of the dental instrument.

Further, neither type of instrument includes two blades disposed on opposite ends of the handle so that one blade is beveled and angled for ergonomic use on one side of a tooth and the other blade is configured and angled for ergonomic use on the other side of the same tooth. For example, U.S. Des. Pat. No. 435,293; U.S. Pat. Nos. 1,369,582; 5,816,806 issued Oct. 6, 1998; U.S. Pat. Nos. 5,913,682; and 6,247,477 all teach devices having a cylindrical handle with a curved pick extending from one end. While the curved picks taught by these patents may be useful for removing dental plaque, they are not well suited for carving excess hardened composite from a top layer of a filled tooth to provide a smooth surface or for removing hardened composite resin from interproximal or other tooth surfaces.

Moreover, each of the aforementioned patents teaches a curved pick that is entirely disposed within the plane of the axis of the handle. These devices are not designed for use at an angle that minimizes discomfort to the patient or for use on the right and left surfaces of tooth which curve in opposite directions.

Other dental instruments for cleaning teeth or dispensing a liquid agent on teeth are described by U.S. Des. Pat. No. 199,832; U.S. Pat. Nos. 3,101,727; and 6,526,993 and teach devices having an edged planar surface extending from a handle or grip. While each device is intended for use in cleaning teeth or for dispensing a liquid agent on teeth, none of these incorporates a curved concave or beveled edge suitable for carving hardened composite off of interproximal surfaces of a tooth.

Dental scaling instruments also do not effectively or safely remove excess dental resin composites. U.S. Pat. No. 4,060,897 teaches a device for cutting and lifting dental restoration material and U.S. Pat. Nos. 5,127,833 and 5,169,313 teach a device for scaling teeth that incorporates a shaft to prevent contact between the sharp edge of the device and the patient's cheek or tongue. However, these devices, do not incorporate a blade contoured and beveled to carve hardened dental composite from the interproximal surfaces of a tooth, nor do these devices incorporate two mirror-imaged blades extending from opposite ends of a cylindrical handle so that each blade is in a plane at an angle with the axis of the handle so as to provide a dental instrument that can be used to remove hardened dental composite from right and left interproximal surfaces or that conveniently can be used by either left-handed or right-handed practitioners.

In view of the lack of dental instruments specifically designed to safely, quickly, and efficiently remove hardened dental composite from the surfaces of teeth, the inventors sought to design an instrument that would solve the problems described above.

SUMMARY OF THE INVENTION

A scalpel that has a shaft with one working end having a blade, and preferably with two working ends comprising concave blades one of which is oriented to carve along a left side of a tooth and the other along a right side. The working end contains blade having its base or spine adjacent to or connected to a plate that is preferably arranged at a substantially right angle to the blade forming a T shape. The blade is sufficiently hard to remove residual dental restorative materials, such as hardened dental composite resins, from the surface of teeth and is sized to comfortably fit within the mouth of a patient. The scalpel includes a plate which provides for better handling and application or pressure to the blade as well as serving a safety feature which prevents the scalpel from deeply penetrating soft tissue. In some embodiments, a working end may contain an abrasive end, such as a file, that is hard and abrasive enough to remove dental composite, such as one with an abrasive surface (e.g., coated or layered with diamond, cBN, carborundum or any material that is harder than the composite to be removed). In some embodiments, a working end may contain an abrasive tip or surface, such as a file, to remove dental composite, such as one with an abrasive surface (e.g., coated or layered with diamond, cBN, carborundum or any material that is harder than the composite to be removed and preferably less hard than tooth enamel).

After a dental procedure, such as filling a cavity with a composite resin, the scalpel may be used by a dental practitioner to comfortably, conveniently, and efficiently shape, contour and remove residual hardened dental restorative material from the surface of teeth including from interproximal surfaces, occlusal surfaces, as well as proximal and distal lingual and buccal surfaces without excessive stretching of the patient's lips and cheeks.

The following examples illustrate various aspects of the present invention. They are not to be construed to limit the claims in any manner whatsoever. Nonlimiting embodiments of the invention include:

A scalpel, comprising a shaft and at least one working end connected to the shaft, said working end comprising a blade having a spine adjacent to or connected to a plate, wherein the dental scalpel is of a size suitable for comfortably removing a dental restorative material on a surface of a tooth.

Usually, the dental instrument, or its individual components including the blade, plate and shaft, will be about the same size as that shown in FIG. 6 or 7 or within a size range of 0.5 to 1.5-times the size depicted in these figures or with the same or similar proportions to human teeth. This range includes all subranges and intermediate values such as 0.5, 0.6, 0.7, 0.8, 0.9, <1.0, 1.0, >1.0, 1.1, 1.2, 1.3, 1.4, <1.5 and 1.5.

In some embodiments, the length of the blade will range from about 10-15 mm, the height of the blade will range from about 2-5 mm, the thickness of the blade will range from about 0.02-0.04 mm, the length of the plate will range from 15-20 mm, the diameter of the plate will range from 4-12 mm, the length of the shaft will range from about 6-24 cm and the diameter of the shaft range from about 2-4 mm. The length and thickness of the shaft, overall length of the entire scalpel, or other dimensions, are selected to provide durability, a secure grip, ease of handling, and maneuverability of the scalpel while in use.

A blade may be curved or have any configuration known in the dental or surgical arts or those configurations described herein. Preferably, the blade is concave so as to conform to a convex surface of a tooth.

In some embodiments, the scalpel may be monolithic where the blade, plate and shaft form a single unit.

In most embodiments, the working end, such as either the blade or plate, or a unit containing both the blade and plate, is removable from the shaft, for example, via a blade holder as illustrated by FIGS. 1-3 and 5 which depict a working end with a slot to receive a blade and plate.

The blade holder, which may be a slot or other mechanical connection between the shaft and working end, is arranged so that a working end may be exchanged with a new or different kind of blade or combination of blade and plate. In some embodiments, the scalpel will have a single working end, however, preferably, the scalpel will have two working ends. For example, one working end may be configured to carve along a left side of a tooth and the other to carve along the right side of a tooth, so that the practitioner does not need to exchange tips, but merely switch from use of one end of the scalpel to the other to carve along the right and left surfaces of a tooth.

In some embodiments, the scalpel blade will have a left side bevel and in others a right side bevel so as to facilitate carving along either the left or right side of a tooth; in others, the blade may be beveled on both sides. Preferably, when the scalpel has two working ends, the blade on one working end has a left side bevel and the blade on the opposite end has a right side bevel. This permits the practitioner to use a single scalpel to conveniently and comfortably remove dental restorative or resin from either side of a tooth.

In embodiments where a shaft has two working ends, the orientation of the blades on each end may be the same or different. For example, each blade may be coaxial with the shaft or point upward or downward at the same or a different angle with respect to the shaft. In some embodiments, the blade on one end will point upward and the blade on the other end downward. In other embodiments, the bevel on the blade will be on the same side of the shaft as the blade on the other end, in others the bevels on a cutting blade will be on different sides of the shaft.

One embodiment of the invention is directed to a dental carver configured for removing interproximal composite deposits. The carver has an elongated handle with a curved blade attached to each of its two ends. Each blade is oriented at an angle relative to the handle so that each blade may be easily manipulated in the mouth of a dental patient with minimal discomfort to the patient. The cutting edge of one of the blades is oriented to carve along the left side of a tooth when the blade is inserted into a patient's mouth, and the cutting edge of the other blade is oriented to carve along the right side a tooth when inserted into a patient's mouth. With the cutting edges oriented in opposite directions, the instrument can be used in an ergonomic manner on either side of a given tooth by simply changing which end of the instrument is inserted into the patient's mouth.

In a preferred configuration, the spine of the scalpel blade will adjoin the plate at a substantially perpendicular angle so that the blade forms a base of a T shape. In other embodiments, the blade may be oriented at less than, or more than, 90 degrees as with respect to the plate. The configuration of blade, plate and shaft is selected so as to provide a greater nicety of balance and design and to reduce the risk of injury to both the patient and practitioner during use of the scalpel and, for scalpels with replaceable working ends, during the exchange of a working end.

In some embodiments, instead of a T shape adjoinder, the blade and plate may be adjoined via an inverted triangular support or any other connection that permits a practitioner to manipulate the blade or apply finger pressure to the blade via the plate.

In some configurations two lateral sides of a plate may each be adjoined to a blade to form an inverted triangle with two blades substantially intersecting at the lower vertex of the triangle. This configuration provides more blade edge and can permit the same working end to be used for a longer time than a working end having a single blade.

The orientation of the working end can be measured with respect to the longitudinal axis of the shaft by measuring the angle between a longitudinal axis of the plate aligned on the working end and the longitudinal axis of the shaft. A working end may be co-axial with the shaft or handle of the scalpel or may be oriented upward or downward at an acute, right or obtuse angle, for example, it may be oriented upward or downward (with respect to the direction the cutting edge of the blade is facing) at an angle between 0, 10, 20, 22.5 30, 40, 45, 50, 60, 67.5, 70, 80 or 90 degrees. In some embodiments the working end may assume an obtuse angle, such as 135 degrees, and form a U or V shape with the shaft. Such orientations may be used to access rear (buccal) surface of teeth that may otherwise difficult to reach. This range includes all intermediate values and subranges. A dental practitioner may select an appropriate working end or blade angle depending on the location of dental composite or restorative being removed.

In some embodiments, the blade, plate, and shaft are monolithic or the shaft and plate are monolithic, but not the blade.

In other embodiments the blade and plate are monolithic and may be replaced or exchanged in the shaft as a unit.

In other embodiments, the blade and plate are separate from each other and from the shaft and may independently be replaced.

In some embodiments, different shafts may be combined with particular kinds of replaceable blades or units of blades and plates. For example, shafts may have different lengths, diameters, balance points, or ergonomic characteristics such as different handles, grips, textures or coatings.

The invention is also drawn to a kit that offers the dental practitioner a choice of scalpels with different features.

A kit may comprise two or more different shafts of different lengths, diameters, balance points, or ergonomic characteristics such as different handles, grips, textures or coatings. A left- or right-handed practitioner, a practitioner with small or large hands, or with a strong or delicate grip may select a suitable handle from amongst those in the kit.

A kit may provide two or more, or a series of, scalpels having different shaped or sized blades, blades with different degrees of hardness, blade orientations, or other physical characteristics. The scalpels may be monolithic and two or more scalpels in the kit may have the same or different blades, or the same or different spacing between the bevel or cutting edge of a blade and the plate. In embodiments where the blade, or a blade and plate unit, are replaceable, the kit may contain two or more replaceable blades or blade and plate units with the same or different features. The kit permits a practitioner to select a scalpel, blade, or plate with features suitable for carving a particular tooth surface while reducing the risk of accidental injury to the patient or the practitioner.

A kit may also provide two or more, or a series of, different kinds of plates, for example, rounded rectangular, oval, or triangular shaped plates, plates having different lengths, thicknesses, or surface areas, plates having either a concave or convex surface to facilitate manipulation or the application of finger pressure to the scalpel, or plates having different ergonomic features such as non-slip or soft surfaces. These plates may form part of a replaceable blade and plate unit, or each type of plate may be incorporated into a particular monolithic scalpel.

Another aspect of the invention is a method for removing hardened dental composite or other dental restorative materials from the surface of a tooth comprising contacting the hardened dental composite with a scalpel according to the invention.

In some embodiments, a dental composite may be contacted with a softening agent or solution prior to removal of the composite by the scalpel of the invention.

The method is generally directed to human teeth, but may also be applied to other mammals in which similar dental restorative procedures are practiced, or in the production of dental prosthetics in which residual or excess composite dental resin or restorative is removed.

These and other objects of the present invention will become readily apparent upon further review of the following specification and drawings.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 depicts an embodiment of the dental scalpel of the invention. The left working end (400) has a blade beveled on its left side (30), while the right working end (500) as a blade beveled on its right side (30). The body (300) of the dental instrument may be held by the fingers and hand.

FIGS. 2A, 2B, 2C and 2D, respectively, depict four different views of the invention.

FIGS. 3A, 3B and 3C provide three views of one end of the dental instrument depicting blade tip (10), cutting edge (20), bevel (30), cheek (40) and plate (100). Together FIGS. 3A-3C depict blade tip (10), cutting edge (20), bevel (30), cheek (40), spine (50), support/neck/cheek (60), plate (100), plate neck (110), slot (200) and shaft (300).

FIGS. 4A and 4B show two different views of one end of the dental instrument with the blade beveled on the left side. Together FIGS. 4A and 4B depict blade tip (10), cutting edge (20), bevel (30), cheek (40), and plate (100).

FIGS. 6A and 6B depict how the oppositely beveled blades on each working end of a dental instrument can be used to remove hardened dental cement from the right or left surfaces of a tooth.

FIGS. 7A and 7B depict a dental scalpel with a replaceable blade and plate (100). FIG. 7C depicts a dental scalpel having a metal body and one working end.

DETAILED DESCRIPTION OF THE EMBODIMENTS

Figure 5A:
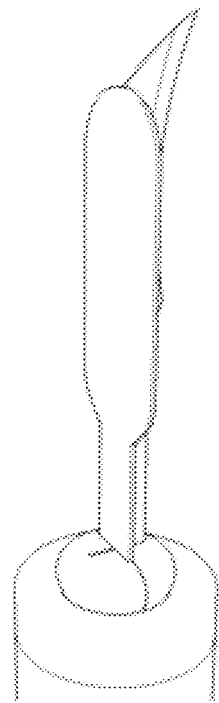
FIGS. 5A and 5B show the opposite working ends of a dental instrument with the blade beveled on either the left or right side.
Figure 5B:
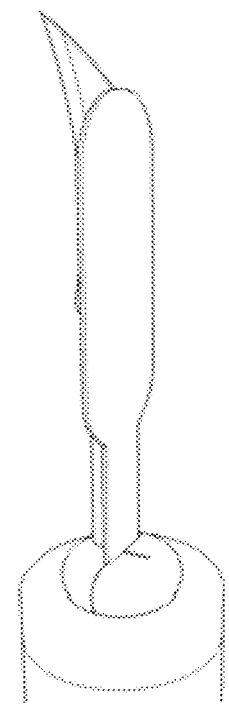
Figure 7A:
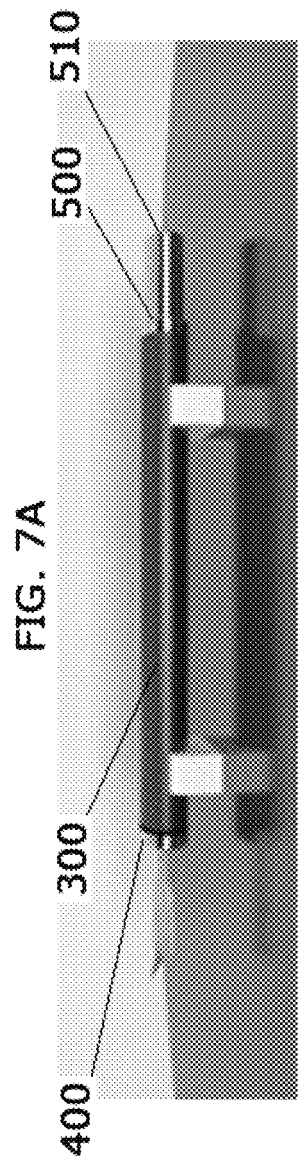
FIGS. 7A, 7B and 7C depict particular embodiments of the invention.
Figure 7C:
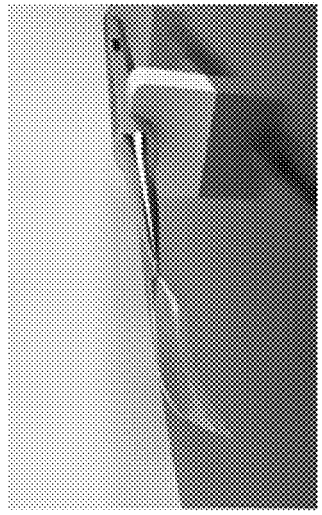
Figure 7B:
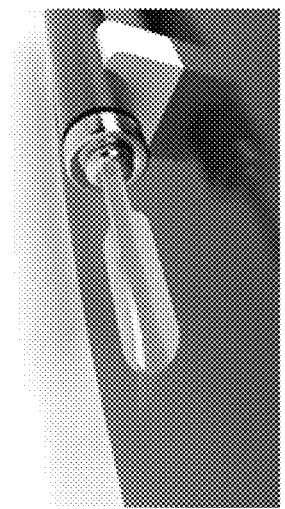

Blade.

The blade may be made of any medically acceptable material not hazardous for human health, such as stainless steel, carbon steel, surgical steel or other durable metal alloys. It may be made of or contain titanium, nickel, vanadium or aluminum. In some embodiments, the blade will be subjected to a hardening treatment such as ion implantation or hard-facing (deep nitriding) to improve durability and wear-resistance. In other embodiments the blade or the cutting edge may be coated with a nickel-titanium coating, a nickel-titanium-nitride coating, or another durable coating to retain a sharp edge and provide corrosion resistance. A non-disposable blade will be made of a material that does not substantially corrode or lose its sharp edge after repeated sterilization or that can be honed and sharpened between uses. Generally, a blade will be made of a material that is harder than the hardened dental composition being removed from teeth, for example it will have a Vickers hardness of 50, 100, 150, 200 that is more than most hardened dental composites, but the blade will have a Vickers hardness less than that of tooth enamel. For safety, a blade may be covered by a sheaf or cap or contained in wrapper.

In contrast to many scalpels using to remove soft tissue or to dental scalers that remove calculus/tartar, the blade of the scalpel of the invention is configured with a plate and blade support to reduce the risk of soft tissue injury and is made of or coated with a metal or metal alloy (which may be tempered or ion-treated) so as to facilitate safe removal of hardened dental composite. In contrast to dental instrument used to remove soft tissue and calculus/tartar, the scalpel of the invention needs to sharp and be able to exert high force necessary to remove hardened composite resins from enamel without damaging a resin restoration.

A blade may have a variety of geometries including hollow ground, flat ground, sabre ground, chisel ground, double bevel or compound bevel, and convex ground geometries. Geometries include the S1-S7 and C1-C7 geometries described by https://_en.wikipedia.org/wikiBlade (last accessed Aug. 22, 2017) which is incorporated by reference. In some embodiments a blade will have a tip, cutting edge, bevel, cheek, spine and/or neck to facilitate attachment to a shaft or handle. In some preferred embodiments, the blade will have a curvature similar to a No. 12 surgical blade.

In some embodiments, the cutting edge will have a bevel on one side only; in others it will have a bevel on both sides. A cutting edge of a blade may be right- or left handed, for example, the blade may be beveled on the left side providing a cutting edge on the left side of the blade (when viewed from the center of the shaft) or be beveled on the right side providing a cutting edge on the left side.

In preferred embodiments, the blade will have a support blade/cheek/neck, as depicted by (60) in FIG. 4 that is 2-4 mm deep, spanning the distance between the plate or blade spine and the bevel or cutting edge. In distinction to most surgical scalpels, this support in combination with the plate feature prevents the scalpel of the invention from deeply penetrating soft tissues, thus substantially reducing the risk of lacerations to both the patient and practitioner. This support may range in depth from 1, 2, 3, 4, 5 mm or more depending on the degree of safety desired, the kind of dental resin being removed, and the orientation of the tooth surface.

Plate.

Forms part of a working end of the scalpel of the invention and allows a practitioner to apply force or pressure from a finger to the working end to facilitate removal of a hardened dental composition from a tooth. Its length and width helps position the blade and prevent forward or lateral blade slippage. The plate also provides for fine control over manipulation of the dental scalpel in the oral cavity compared to conventional scalpels not having a plate, thus increasing patient safety.

Preferably, the plate will have no sharp or pointed edges. In some embodiments, the plate will have a rounded rectangular, oval, or triangular shape of sufficient area and distance from a handle portion of the shaft to permit a practitioner to apply finger pressure to the plate. In other embodiments, the plate may have a convex or concave surface to facilitate manipulation or the application of finger pressure to the scalpel, for example, the plate may be made concave to accommodate a fingertip or convex so as to permit a finger to apply pressure via the plate at different angles by rolling a finger to one side or the other of the plate. It may contain one or more ridges or be sloped or banked toward or away from the center of the scalpel to facilitate the application of reverse or forward pressure to the scalpel.

The plate may be textured, roughened, or coated to prevent slippage of a finger from it and thus provide for dexterous control of the scalpel. In other embodiments, the plate will not be substantially larger than a size required for a practitioner to apply finger pressure through it to the scalpel.

In many embodiments the plate and blade will be arranged in a T-shape with the plate forming a supporting base for the blade, for example, where the spine of the blade contacts the plate.

In some embodiments, the plate and blade may be monolithic. In embodiments where the blade is replaceable, the monolithic blade and plate are replaced as a unit. In other embodiments, the plate and blade are not bound together and one or both may be separately replaced. The entire scalpel or its various parts may be single- or multiple-use.

Shaft.

A "shaft", "handheld shaft" or "body" refers to an elongated portion of the scalpel which is usually configured so that it may be held in a hand. The more distal parts of the shaft from its center point may comprise a tapering waist, shoulder portion, or arm which form portions of, and help position, the scalpel blade. The shaft may comprise one or more of metal (e.g., stainless steel, carbon steel, surgical steel, which may be coated with an alloy such as nickel-titanium; iron, titanium or aluminum or their durable alloys), plastic, ceramic or composite materials, for example, it may be constructed from a composite resin containing metal, glass, carbon, or resin fibers or fillers. The shaft may include a recess, slot or other blade holder which can receive a proximal end of a blade or blade assembly, such as a unit comprising a blade and plate. Generally, the shaft will act as, or further comprise, a handle portion.

Portions of the shaft may be coated, texturized, fluted, roughened, or otherwise ergonomically shaped to provide for a firm grip and dexterous control of the instrument. It may be coated with silicone, plastic, or other coatings to provide a soft and firm grip. The shaft can act as a handle which in conjunction with the plate on the working end of the scalpel permits a practitioner to manipulate and/or apply pressure or force to the working end to facilitate removal of hardened dental composite by the blade. However, a shaft may also be configured to be manipulated by a waldo, machine, dental equipment, or other devices.

Blade Holder.

Blade holders, including those used for scalpels, razor blades and craft knives (e.g., X-Acto™ knives), are known in the art and incorporated by reference to Karapetyan, U.S. Pat. No. 7,131,982 B2. A blade holder may be arranged on one or both ends of the shaft of a dental scalpel of the invention. A blade holder may allow rotation or pivoting of a blade that it holds and may have a locking mechanism such as a slide-lock, snap fit, mating jaw, or chuck mechanism. In some embodiments, the blade holder will comprise a slot into which the proximal (non-cutting end) of a blade can be inserted or T-shaped or cross-shaped slots to accommodate insertion of a combination of blade and plate.

In addition to a hole or slot to receive a blade and/or plate, a blade holder may comprise a receiver to hold the blade inside the shaft and/or a securing member to secure or lock the blade and/or plate to the shaft. The blade holder permits replacement of blades that are dull or contaminated with fresh or sterile blades, or the exchange of blades having different physical or structural features, such as different blade hardness or different blade shapes. In some embodiments the blade holder permits a used or contaminated blade to fall freely from the scalpel without direct contact between the user and the blade.

A blade holder may further comprise an arm assembly that can position the blade or working end in different positions, such as at different angles with respect to the longitudinal axis of the shaft, or in retracted or in one or more operationally extended positions.

In some embodiments the working end is integral with the handle and a blade holder is not required, for example, for a disposable scalpel, the blade, plate and shaft may be monolithic and non-replaceable. Similarly, a reusable scalpel may have a monolithic blade, plate and shaft in a fixed orientation.

Composite Resin.

A "dental composite", "dental composite resin" or "dental restorative" includes synthetic resins which are used in dentistry as restorative material or adhesives. Synthetic resins evolved as restorative materials since they are insoluble, aesthetic, insensitive to dehydration, easy to manipulate and reasonably inexpensive. Composite resins are most commonly composed of Bis-GMA and other dimethacrylate monomers (TEGMA, UDMA, HDDMA), a filler material such as silica and in most current applications, a photoinitiator. Dimethylglyoxime is also commonly added to achieve certain physical properties such as flow ability. Glass ionomer cements are also contemplated. Further tailoring of physical properties of these materials may be achieved by formulating unique concentrations of each constituent.

A hardened dental composite or restorative refers to one that is partially or fully hardened, for example, it may be substantially completely hardened via polymerization or 10, 20, 30, 40, 50 60, 70, 80, 95, or <100% hardened (this range includes all intermediate values and subranges). However, in some embodiments, a hardened dental composite may be softened by contact with a softener prior to its removal with the scalpel of the invention. Vickers hardness of hardened composite resins may range from about 40 to 80; see K. H. Al-Samadani, Journal of Contemporary Dental Practice, December 2016; 17(12):978-984, incorporated by reference.

Teeth Surfaces.

Interproximal surfaces occur between teeth. Buccal surfaces face outward from the mouth, while lingual surfaces are those behind the teeth. Mesial surfaces are those closest to the median plane, while a distal surface is that opposite from the mesial surface. Occlusal surfaces appear on the top of teeth, such as the relatively flat surfaces on top of molars.

Tooth enamel ranks 5 on Mohs hardness scale, has a Young's modulus of 83 GPa and a Vickers hardness of about 250 to 360; see Staines, et al. (1981) "Spherical indentation of tooth enamel". Journal of Materials Science 16 (9): 2551-2556, and Gutiérrez-Salazar et al., Mat. Res. 6(3), São Carlos April/June 2003, which are incorporated by reference. While conventional devices are hard enough to remove hardened composite, sometimes harder than enamel, they are not safe to soft tissues.

Carving and Contouring.

Excess or residual dental restoration materials, such as composite resins often remain after a tooth is filed or repaired. For example, many dental composite resins suffer from extensive contraction during polymerization which affect marginal sealing of a restoration and can result in application of excess resin, especially when posterior teeth are restored. While current efforts are focusing development of non- or minimally-shrinking dental composites containing spiro-orthocarbonates as additives to dimethacrylates or epoxy-base resins, and the production of alternative filler materials for ideal wear resistance and esthetics, there is still a need for shaping and contouring a restoration as well as for removal excess or residual dental resin. In a preferred embodiment of the invention, a blade, such as concave blade shaped similarly to a No. 12 surgical blade, which can conform to a convex interproximal surface of a tooth or restoration, is used to shape, contour and remove excess composite resin. Carving procedures may involve first carving distal, mesial, lingual, and facial convex surfaces using a scalpel according to the invention, followed by carving adjacent marginal ridges and contact areas and embrasures. It may also involve as carving parallel to a cavosurface margin. Carving procedures are described in more detail by Wiland, U.S. Pat. No. 4,270,902, which is incorporated by reference.

Terminology.

Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by insertion of a space or underlined space into a link, for example, before "www" or after "//" and may be reactivated by removal of the space.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it is also envisioned that Parameter X may have other ranges of values including 1-9, 2-9, 3-8, 1-8, 1-3, 1-2, 2-10, 2.5-7.8, 2-8, 2-3, 3-10, and 3-9, as mere examples.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

REFERENCES

Further background information and descriptive support for dental restoration materials and useful features of dental instruments may be found in one or more of the following references which are incorporated by reference.

Gray, H. S., Gavin, J. B. The surface texture of trimmed composite fillings. A scanning electron microscopy study. NZ Dent J. 1975; 71:139-145.

Hietanen, J., Rantanen, A. V. Evaluation of different composite finishing methods. Proc Finn Dent Soc. 1976; 72:11-18.

Lutz, F. Beitrage zur Entwicklung von Seitenzahn-Komposits. KAR PAR PZM Verlag, Zurich; 1980:1/7-75/7.

McCabe, J. F., Caddick, R. J. The finishing of composite restorations. Br Dent J. 1978; 145:101-104.

Valcke, C. F. Some surface characteristics of composite resin filling materials. J Dent Assoc S Afr. 1978; 33:21-27

Porte, A. Cavity design for composite resin. (Others) AADR Program and Abstracts, 1983 (Abstract no. 764).

Oilo, G., Jorgensen, K. D. Effect of beveling on the occurrence of fractures in the enamel surrounding composite resin fillings. J Oral Rehabil. 1977; 4:305-309.

Dennison, J. B., Craig, R. G. Physical properties and finished surface texture of composite restorative resins. JADA. 1972; 85:101-108.

Finger, W., Jorgensen, K. D. Polymerisationsinhibition durch Sauerstoff bei Kompositfullungsmaterialien und Schmelzversieglern. Schweiz Mschr Zahnheilk. 1976; 86:812-824.

Hannah, C. Med., Smith, G. A. The surface finish of composite restorative materials. Br Dent J. 1973; 135: 483-488.

Heath, J. R., Wilson, H. J. Surface roughness of restorations. Br Dent J. 1976; 140:131-137.

McLundie, A. C., Murray, F. D. Comparison of methods used in finishing of composite resin—a scanning electron microscopy study. J Prosthet Dent. 1974; 31:163-171.

De Gee, A. J., Ten Harkel, H. C. Abrasion of composite materials by tooth brushing. J Dent Res. 1982; 61:571 (abstract no. 61).

Bartenstein, U., Finger, W. Bestimmung der Oberflachengute von Composite-Fullungsmaterialien. Dtsch Zahnaerztl Z. 1974; 29:276-282.

Forsten, L. Fracturing of marginal enamel when finishing composite fillings with rotary instruments. Proc Finn Dent Soc. 1977; 73:38-39.

Tolley, L. G., Dennison, J. B., O'Brien, W. J. Surface finish of composite materials. J Dent Res. 1977; 56:217 (abstract no. 663).

Chandler, H. H., Bowen, R. L., Paffenbarger, G. C. Method for finishing composite restorative materials. JADA. 1971; 83:344-348.

Lutz, F., and Phillips, R. W. Classification of composite resin systems and their evaluation. J Prosthet Dent, to be published.

Lambrechts, P., Vanherle, G. Observation and comparison of polished composite surfaces with the aid of SEM and profilometer. J Oral Rehabil. 1982; 9:169-182.

Nathanson, D., Dogon, I. L., Van Leeuwen, M. J. A comparison of a new method for finishing composite restorations with conventional techniques—in vivo study. J Dent Res. 1978; 57:367 (abstract no. 1170).

Ferreira, M. R., De Wet, F. A. Effect of finishing agents on new restorative resins: a SEM study. J Dent Res. 1982; 61:605 (abstract no. 22).

Louka, A. N., Stillwater, J. C. Effectiveness of different finishing systems on composite resin surfaces. J Dent Res. 1982; 61:302 (abstract no. 1113).

Johnson, L. N., Jordan, R. E., Lynn, J. A. Effects of various finishing devices on resin surfaces. JADA. 1971; 83:321-331.

Volchansky, A., Cleaton-Jones, P. Study of surface characteristics of natural teeth and restorations adjacent to gingivae. J Prosthet Dent. 1974; 31:411-421.

Sokal, R. R., Rohlf, F. J. Biometry. W. H. Freeman, San Francisco; 1981:248.

Lutz F, Setcos J, Phillips R. New finishing instruments for composite resins. J Am Dent Assoc. 1983; 107:575-580.

Fruits T, Miranda F, Coury T. Effect of equivalent abrasive grit sizes utilizing differing polishing motion on selected restorative materials. Quintessence Int. 1996; 27:279-285.

Oward S. Glazer, DDS, FAGD. Can an Instrument Make a Difference?

Ivoclar Vivadent. Optra sculpt Pad: Modeling instrument for composite filling materials. Amherst, N.Y.: Ivoclar Vivadent: 2005: 1-2.

The invention claimed is:

1. A dental scalpel for tooth surface cosmetic treatment, comprising:
a substantially cylindrical shaft with a tapering waist having two ends, a flat plate, a tapered proximal support neck narrower than the flat plate, and a detachable blade having a concave cutting edge conforming to a convex surface of a tooth which has a proximal support neck, wherein the shaft has a length of 6-24 cm and a texturized surface;
wherein a spine of the detachable blade is perpendicularly attached to the flat plate along a longitudinal midline of the flat plate to form an assembly,
wherein the concave cutting edge of the detachable blade is on the side of the detachable blade,
wherein the proximal support neck of the flat plate and detachable blade in the assembly fit into a cross-shaped opening on one end of the shaft so that when the concave cutting edge of the detachable blade faces downward, then the flat plate forms a horizontal surface on top of the detachable blade, and
wherein a distal end of the detachable blade extends past a distal end of the flat plate.

2. The scalpel of claim 1, which has the cross-shaped opening fitted with the assembly of the flat plate and detachable blade on one end of the shaft only.

3. The scalpel of claim 1, which has the cross-shaped opening fitted with the assembly of the flat plate and detachable blade on each end of the shaft.

4. The scalpel of claim 1, wherein the detachable blade is beveled on a left or right side and wherein the scalpel has detachable blades on both ends each detachable blades is beveled on an opposite side.

5. The scalpel of claim 1, wherein the detachable blade ranges in length from 10 to 15 mm, in height from 2 to 5 mm, and in thickness from 0.02 to 0.04 mm.

6. The scalpel of claim 1, where the end of the shaft comprising the assembly comprises the detachable blade is angled upward or downward between about 15 and 45 degrees with respect to a longitudinal axis of the shaft.

7. The scalpel of claim 1, wherein the detachable blade and the flat plate form a single unit and are removably attached to the shaft.

\* \* \* \* \*